United States Patent [19]

Mazzorana

[11] 4,116,077
[45] Sep. 26, 1978

[54] STARTERS

[75] Inventor: Alfred Bruno Mazzorana, Venissieux, France

[73] Assignee: Societe de Paris et du Rhone, Lyons, France

[21] Appl. No.: 737,370

[22] Filed: Nov. 1, 1976

[30] Foreign Application Priority Data

Nov. 7, 1975 [FR] France .................. 75 34934

[51] Int. Cl.² .................. F02N 11/00; F02N 15/06
[52] U.S. Cl. .................. 74/7 A
[58] Field of Search .................. 74/6, 7 R, 7 A

[56] References Cited

U.S. PATENT DOCUMENTS

| | | | |
|---|---|---|---|
| 2,947,179 | 8/1960 | Lafitte | 74/6 |
| 2,960,879 | 11/1960 | Lafitte | 74/6 |
| 3,177,728 | 4/1965 | Farison | 74/7 A |
| 3,283,595 | 11/1966 | Inagaki | 74/7 |
| 3,299,719 | 1/1967 | Toulier | 74/7 |

FOREIGN PATENT DOCUMENTS

| | | | |
|---|---|---|---|
| 903,051 | 2/1954 | Fed. Rep. of Germany | 74/7 A |
| 923,883 | 2/1955 | Fed. Rep. of Germany | 74/7 A |
| 1,091,477 | 10/1954 | France | 74/7 A |

Primary Examiner—Irwin C. Cohen
Attorney, Agent, or Firm—Dowell & Dowell

[57] ABSTRACT

Electric starters for automobile engines and the like comprise a pinion wheel driven by the starter motor, a solenoid switch and a lever operatively connected to the core of the solenoid switch and the shaft of the pinion wheel, so as to move the pinion wheel into mesh with a gear wheel of the engine to be started. In the starter of the present invention the lever does not have a fixed pivot. Instead, the end of the lever associated with the core is aranged to move linearly with the core, while its connection to the pinion shaft allows axial movement of the lever relative to the shaft. Between the two ends the lever has means adapted to bear against fixed surfaces to allow pivoting of the lever. In preferred embodiments means are incorporated which allow the core to complete its travel, even if the travel of the pinion is prematurely arrested by initial failure to mesh with the gear which it is to drive.

6 Claims, 10 Drawing Figures

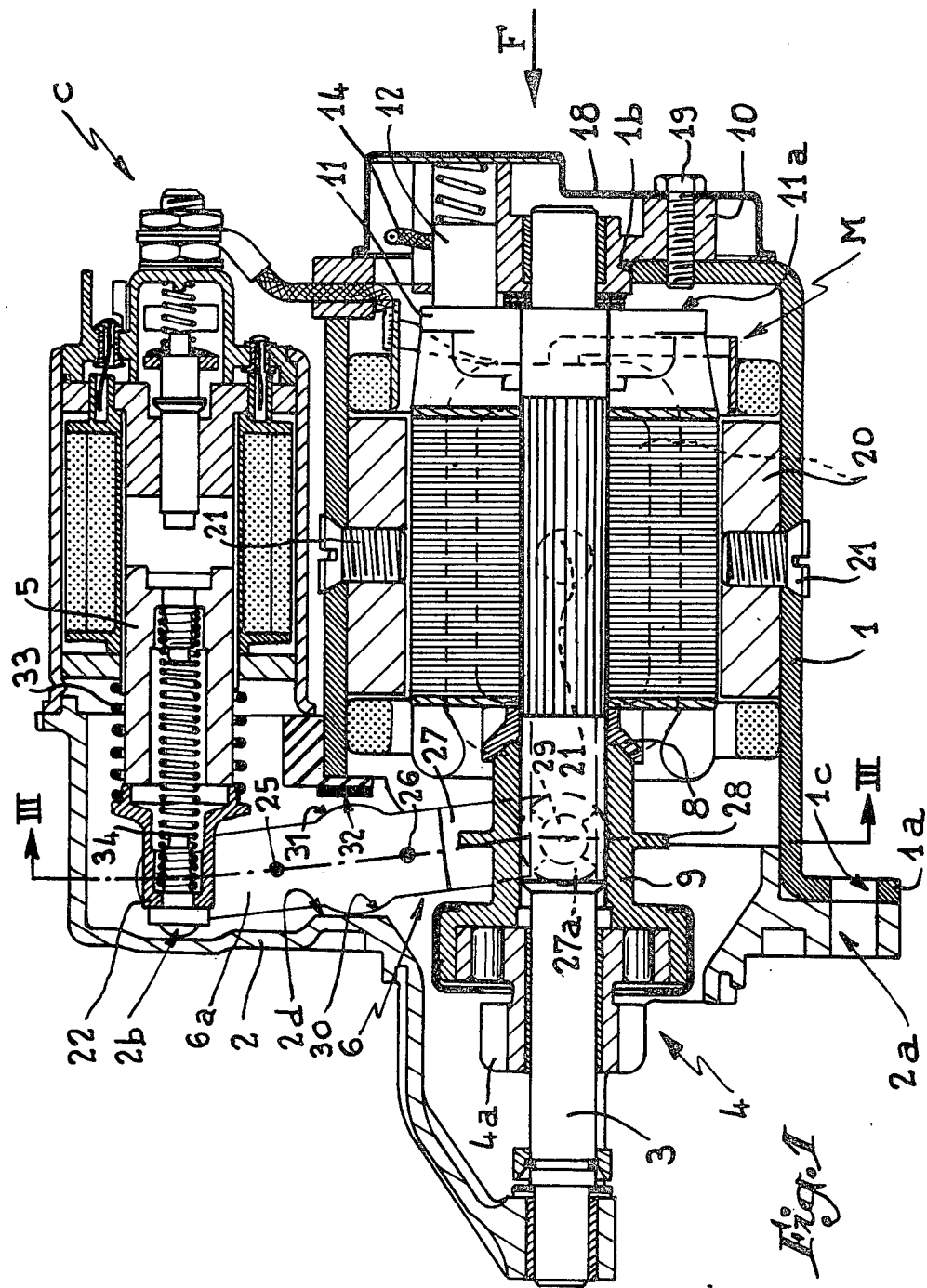

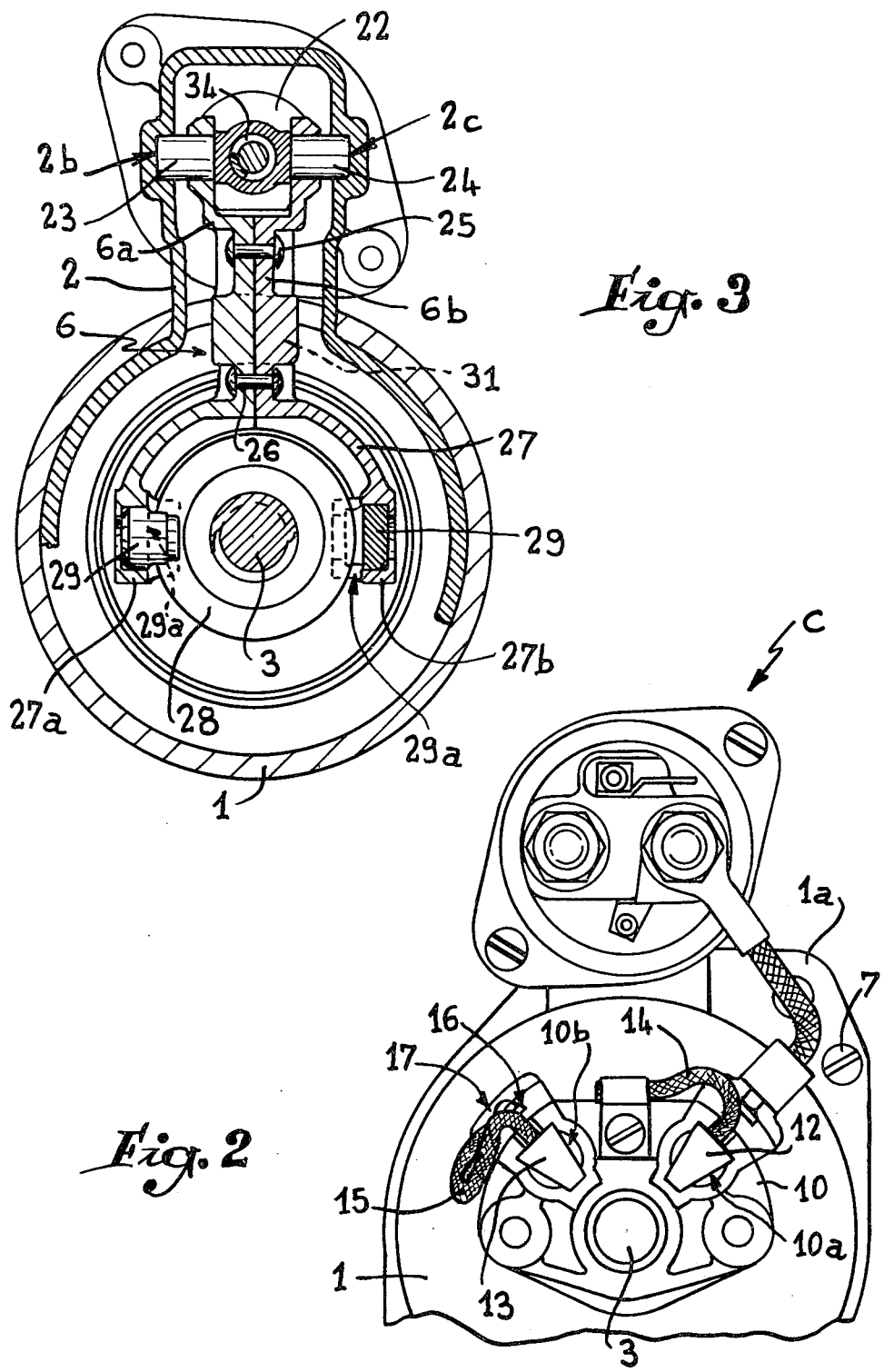

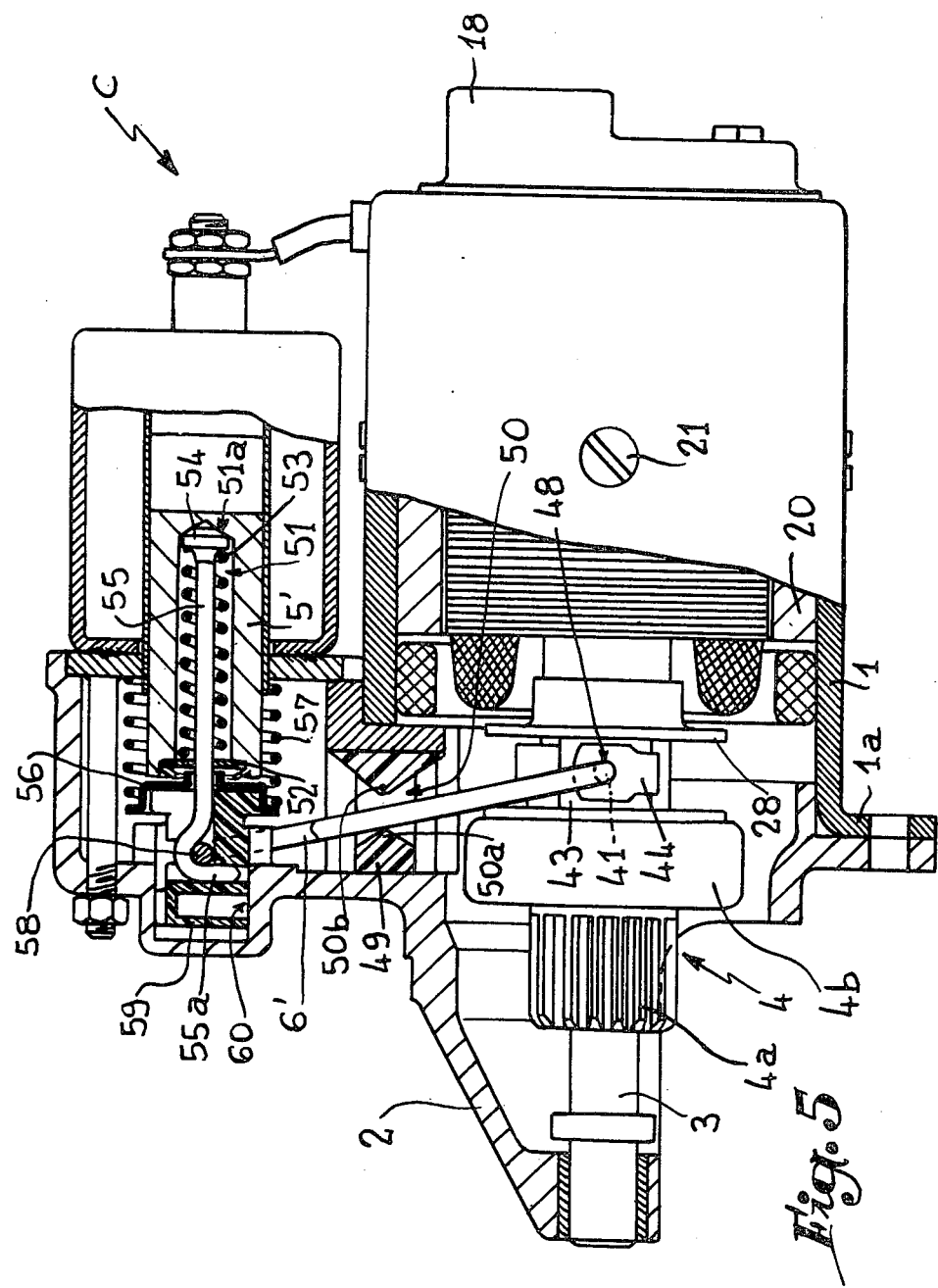

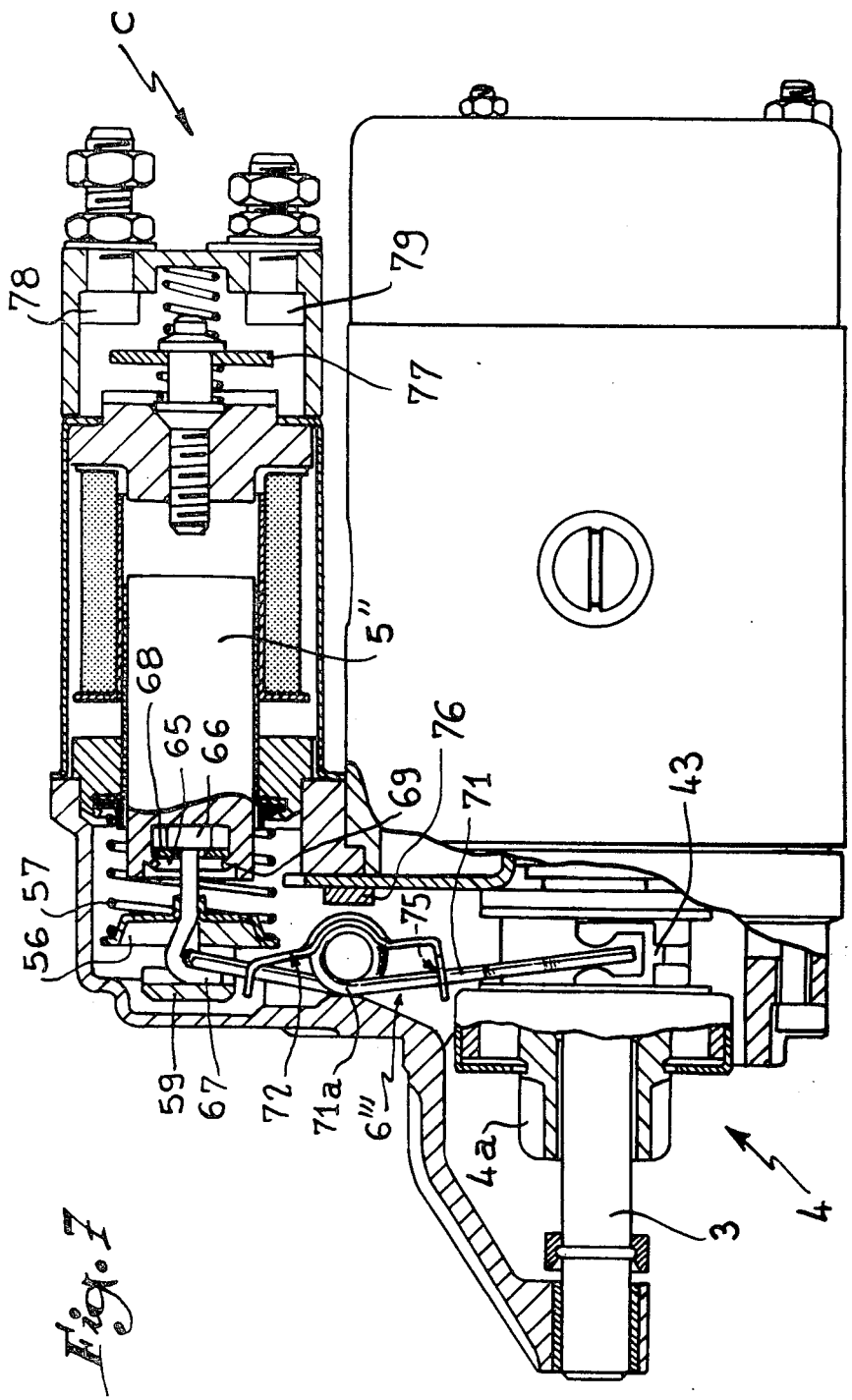

4,116,077

STARTERS

BACKGROUND OF THE INVENTION

The present invention relates to improvements to electric starters generally used for starting engines of motor vehicles. Such starters embody a pinion which is driven by the motor of the starter and the function of this pinion is to drive a flywheel or other gear wheel on the engine. The movement of the pinion shaft of such a device is frequently controlled by a rocker lever, one of the fork-shaped ends of which co-operates with the said pinion shaft, while its other end is associated with a solenoid switch.

SUMMARY OF THE INVENTION

An object of the present invention is to provide a starter which is economical to manufacture and which is reliable in operation.

The starter of the invention is characterised in that the movable core of its solenoid switch is connected to the pinion shaft through a lever associated with the said core in such a way as to move linearly therewith, its connection to the pinion shaft comprising means for allowing axial movement with respect to this latter, while it is provided intermediate of its ends with further means adapted to bear against fixed surfaces in order to allow pivoting of the said lever under the action of the solenoid switch.

According to a particular embodiment, the lever is made in the form of a hairpin-shaped steel wire member, which can be very inexpensively produced, while the space it requires is small.

Means are preferably provided which allow the core to complete its travel, even if the travel of the pinion is prematurely arrested by failure of its teeth to coincide with gaps in the teeth of the gear which it is to drive. This may be done by connecting the core and lever through a spring which permits this further motion of the core, even after the lever has been halted. Alternatively or additionally the lever itself may be made of resilient wire so fashioned as to bias the pinion shaft towards the gear which it is to drive.

BRIEF DESCRIPTION OF THE DRAWINGS

Various forms of the invention are shown by way of example in the accompanying drawings, in which:

FIG. 1 is a longitudinal section through a starter incorporating the improvements according to the invention;

FIG. 2 is a partial external view thereof in the direction of the arrow F in FIG. 1, with the cap protecting the brushes removed;

FIg. 3 is a cross-section on the line III—III in FIG. 1;

FIG. 5 is a longitudinal section through a starter incorporating a lever according to the alternative embodiment in FIG. 4;

FIG. 7 is an elevational view, with parts broken away, showing an electric starter according to another alternative embodiment of the invention;

FIG. 1 shows an electric starter for an internal combustion engine such as the engine of a motor-car, comprising a magnetic housing 1 for the starter motor identified by the general reference M and a drive housing 2 rigid with this housing and which, among other functions, serves as a forward bearing for the shaft 3 of the motor M. In known manner, a starter pinion 4 is mounted on the shaft 3 in such a way that it can move longitudinally while remaining angularly keyed on the shaft during its forward movement. This pinion shaft comprises in particular a pinion 4a adapted to engage with the flywheel of the engine. The motor M is energised by the solenoid switch C of which the movable core 5 is associated with the end of a rocker lever 6 adapted to control longitudinal movement of the pinion shaft 4.

Figure 4:
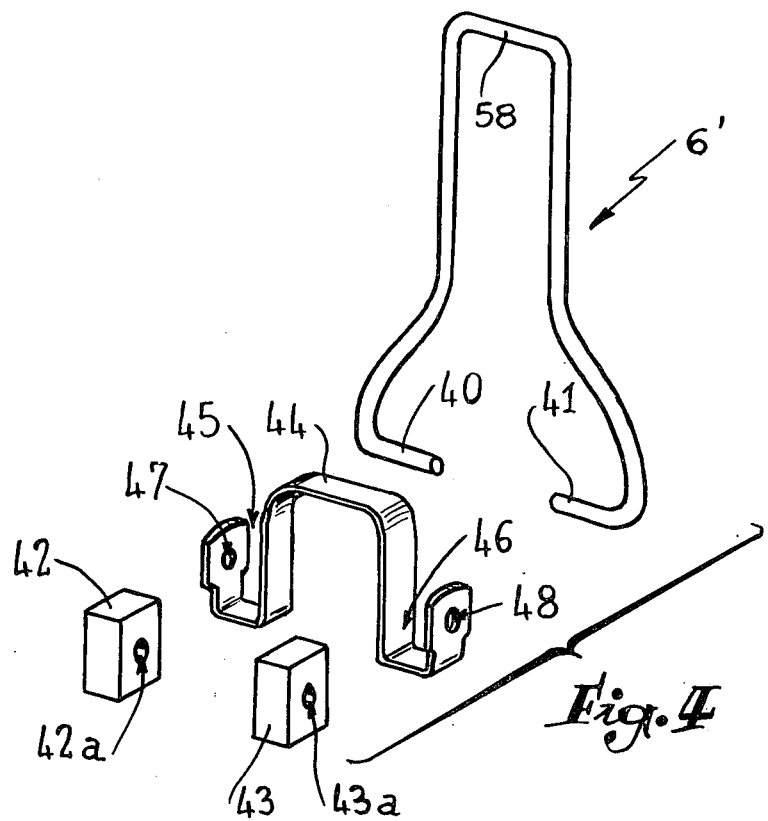
FIG. 4 is an exploded perspective view of the starter pinion operating lever constructed according to an alternative embodiment.

The motor housing 1 is made in the form of a cylindrically walled body pressed out from a sheet-metal blank, one end having a peripheral flange 1a, while the other end is closed by an end wall having an aperature 1b. Provided in the flange 1a are holes 1c disposed opposite the holes 2a in the flange of the drive housing 2, and it is moreover fixed to this flange by means of two fixing screws, one of which is shown at 7 in FIG. 2.

The shaft 3 of the motor carries an armature 11, at one end of which is located a fixed conical dome 8 against which the correspondingly shaped end of the sleeve 9 of the pinion shaft 4 bears when the latter is at rest.

It will be noted that the rear end of the shaft 3 rotates in a support 10 which passes through the aperture 1b in the end of the housing 1 and which likewise constitutes a brush holder. The ends of the armature windings are led to a face-type commutator 11a, oriented at rightangles to the axis of the shaft 3 and opposite the support 10. This latter is traversed by apertures 10a, 10b orientated at right-angles to the commutator 11a and through each of which extends a brush 12, 13 biassed towards the commutator. One of these brushes is connected to earth through a lead 14, while the other is connected to the field core winding by means of a lead 15 which is welded directly onto a terminal 16 of the last field coil; the terminal 16 penetrates through an aperture 17 provided in the end of the pressed-out housing 1, so that it is readily accessible. Therefore, the brushes are fitted from the outside after assembly of all the parts of the starter. A protective cover 18 is then screwed over the brush holder by means of screws 19.

It will be seen from FIG. 1 that the poles 20 of the stator are fixed to the periphery of the housing 1 by means of screws 21.

The end of the core of the solenoid switch C is associated with a bar 22 having two horizontal diametrically opposed cylindrical projections 23, 24 orientated outwardly, and the free ends of which slide in grooves 2b, 2c provided in the casing of the drive housing 2 parallel with the shaft 3 of the motor M (FIG. 3). Articulated about the aforesaid projections 23, 24 is one of the ends of each of two symmetrical parts 6a, 6b constituting the lever 6 which therefore forms a plate around the bar 22. The two parts 6a, 6b are secured one against the other by means of rivets 25, 26 or other means and each terminate at the bottom in an arm which extends away from the centre, so that the bottom end of the lever 6 constitutes a fork 27 straddling the sleeve 9 of the pinion shaft. The periphery of this sleeve has a small collar 28 extending radially outwardly. Each of the ends 27a, 27b of the fork 27 has a cylindrical bore in which a pinion 29 is mounted for free rotation. The pinion extends towards the centre of the shaft 3, its protruding part having a slot 29a so that the split end of each pinion 29 is traversed by the collar 28 of the sleeve 9 on the pinion shaft. As shown in FIG. 1, each of the half levers 6a, 6b has approximately in its centre a rounded swelling 30, 31.

When the starter is energised, the winding of the solenoid switch is excited so that it moves the core 5 towards the right in FIG. 1. The articulation of the lever 6 in relation to this core is arranged in such a way that the end of this lever in question moves linearly with the core, as has been seen hereinabove. Thus, the fork 27 undergoes a translatory movement in the direction of its length, which is made possible by reason of the fact that the connection between this fork and the collar 28 of the sleeve 9 is effected by means of split members 29 which then turn slightly in their seating. At the commencement of the travel of the core, the swelling 31 comes to bear against a fixed bearing surface 32 rigid with the motor housing 1. By reason of this bearing contact, the lever 6 is capable of rocking so as to produce a movement of the pinion shaft leftwards in FIG. 1. In contrast, when the supply circuit to the solenoid switch is open, the core 5 is drawn back leftwards by means of springs 33, 34 so that it is then the swelling 30 which abuts against a surface 2d provided on the inside of the drive housing 2 opposite the bearing 32. The pinion shaft 4 is thus restored to its starting position by pivoting of the lever about the aforesaid surface 2d. Thanks to this arrangement, it will be seen to be possible to do without an intermediate pivoting axle for the lever 6, which makes it possible for the prime cost to be reduced. If the teeth of the pinion do not exactly coincide with the gaps in the teeth on the flywheel of the engine, when the core is first drawn to the right by the solenoid switch winding, the lever 6 and bar 22 is halted, but the core 5 can complete its travel to close the contact of the starter supply circuit against the action of yieldable means comprising a tension spring 34 acting between the core 5 and the bar 22. On energisation of this circuit the armature is rotated and the teeth of the pinion and the flywheel can engage.

As has been indicated above, the dome 8 maintains the sleeve 9 of the pinion shaft in its position of rest, even if the whole of the starter is subjected to external vibrations, for example vibrations generated by the engine with which it is associated.

The lever 6' shown in FIG. 4 is formed from a circular section steel wire which has the general form of a "U" or of a hairpin, the arms of which are bent so that their ends 40, 41 are facing and aligned in opposition to each other. Each of these ends is adapted to co-operate with a block 42, 43 by engaging into a hole 42a, 43a respectively. To maintain the said block in position, a clip 44 is used, made from a flattened pin profile member which assumes the general shape of a "U", having the ends of its legs bent over twice at an angle of 90° outwardly in order to form two channels 45, 46 adapted each to hold one block 42, 43. The outer wall of each channel 45, 46 has in it a hole 47, 48 respectively through which passes the respective end 40, 41 of the lever before it enters the hole 42a, 43a in the corresponding block.

The blocks have a fairly low coefficient of friction; they may advantageously be made from a thermo-setting material containing graphite. As shown in FIG. 5, the clip 44 straddles the shaft 3 of the starter along which the pinion shaft 4 moves, while the blocks 42, 43 bear on the one hand against the collar 28 on the pinion shaft and on the other against a bell-shaped member 4b rigid with the pinion 4a. The distance between the collar 28 and the bellshaped member 4b is slightly greater than the thickness of the block in order to provide functional clearance which may be fixed at 0.2 mm. Of course, the thickness of each block is greater than the width of the channels 45, 46 of the clip 44.

The central portion of the lever 6' passes through a member 49 which forms a double bearing point for each of the arms of this lever; that is to say each of them traverses an aperture 50 which takes the form of a biconical prism defining two points 50a, 50b against which abuts the corresponding arm when the lever is tilted in one direction and the other.

The solenoid switch C has a magnetic core 5' comprising a recessed bore 51 closed by a pierced washer 52 retaining one of the ends of a compression spring 53, the other end of which bears against a stop 54 rigid with the end of an axial rod 55. This rod passes through the washer 52 to become connected with the lever 6' inside a socket 59; this is made by pressure-moulding of a plastics material and provides for correct connection of the rod 55 and of the lever 6'. The socket 59 can move axially in a corresponding depression 60 in the drive housing 2.

It will be readily understood that when the electric supply is fed to the coil of the solenoid switch C, its core 5' moves rightwards in FIG. 5 giving rise to a similar movement of transverse arm 58 of the lever 6' of which the two longitudinal arms abut against the projection 50b causing displacement of the blocks 42, 43 in a leftwards direction in such a way as to displace the pinion shaft 4 in the same direction. If the teeth of the pinion do not exactly coincide with the gaps in the teeth on the flywheel of the engine, the elasticity of the spring 53 ensures that the pressure between the flanks of the teeth of the pinion and those of the flywheel is not excessive. Furthermore and above all, it enables the movable core 5' to complete its stroke, thus closing the contact of the starter supply circuit and ensuring rotation of the armature, so that the teeth of the starter pinion can assume the correct position to penetrate the teeth of the flywheel.

Since the bell-shaped member 4b is rigid with the pinion 4a the action of the solenoid is therefore exerted on a member of considerable strength, which is a certain advantage since it is in this direction that the more significant action is applied to the pinion shaft.

Figure 6:
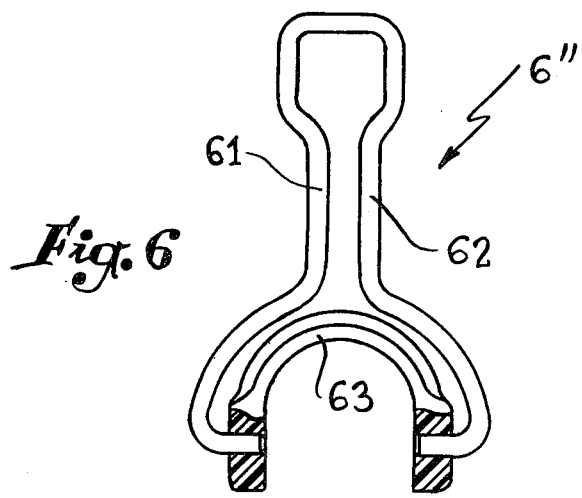
FIG. 6 is a front view, with parts broken away, of an alternative embodiment of the lever shown in FIG. 4.

As shown in FIG. 6, the lever for operating the pinion shaft could have a shape other than that shown in FIG. 4. Each of the arms of this lever 6" may for example have a central part 61, 62 bent inwardly in order as far as possible to reduce the lateral bulk of the drive housing 2. It is likewise possible to do away with the clip 44 and to make the two blocks in a single piece which then has the shape of a clip 63, the ends of which would be pierced to receive the corresponding ends of the arms of the lever 6".

According to FIGS. 7 to 10, the pinion shaft 4 of the starter according to an alternative embodiment is operated through a lever 6''' which is connected at its upper end to the movable assembly or core 5'' of the solenoid switch C.

Figure 8:
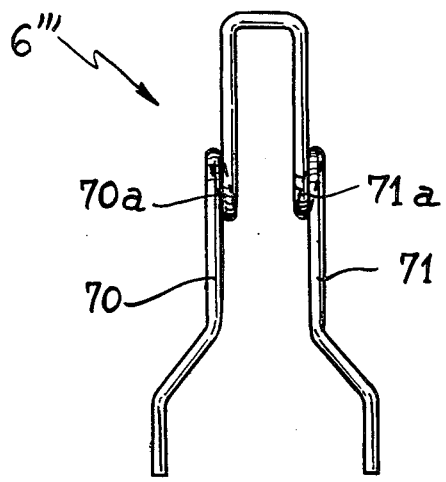
FIG. 8 is an elevation showing the lever constructed in accordance with the alternative embodiment in FIG. 7.
Figure 9:
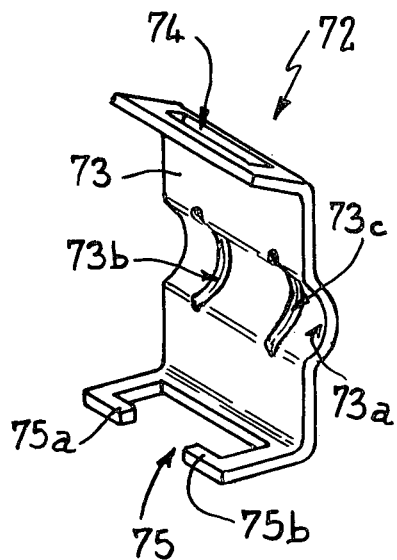
FIG. 9 is a perspective view on a larger scale showing a small plate allowing the pre-tensioning of the lever shown in FIG. 8
Figure 10:
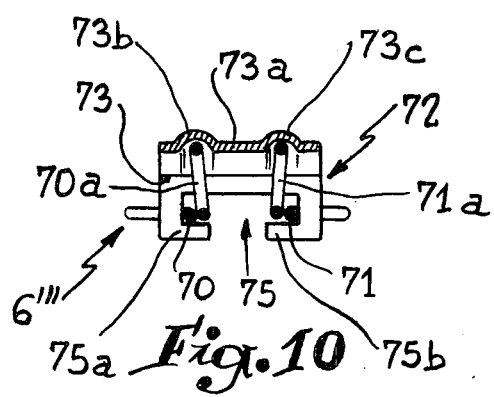
FIG. 10 is a cross-section through the assembly consisting of the lever according to FIG. 8 mounted in the small plate.

The free end of the core 5'' has a recess 65 engaged by the head 66 of a hook 67. After a washer 68 has been placed against the head 66 which itself rests on the bottom of the recess 65, there is bent back over the washer a lip 69 on the periphery of the recess 65. Located on the shaft of the hook 67 is a member which provides a saucer shaped head 56 and a projecting leg 59 having a central socket. The hook 67 fits into the socket of the leg 59 and engages the cross-arm of the lever 6''', this latter being made from a spring steel wire. As shown in FIG. 8, this lever 6''' has two lateral arms 70, 71, the lower ends of which are bent outwardly so that they can co-operate with the blocks 42, 43 which in this case are each made in the form of an open-topped clip, into which directly engages the bottom end of each arm. The arms are looped as shown at 70a, 71a to increase their elasticity. Until pre-tensioned, the top and bottom parts of each arm are in line when viewed in profile. In order to pre-tension the lever 6''', a small plate 72 is used (FIG. 9) which takes the form of a U with a vertical centre portion 73, of which the upper flange has an aperture 74 engaged by the upper part of the lever 6''', while in the lower flange there is a cut-out 75 with an opening, in which is placed that part of each arm which is situated between its loop and its outwardly-bent part. The cut-out 75 forms two shoulders 75a, 75b for retaining corresponding parts of the lever 6''' when this latter is pre-tensioned as shown in FIG. 7, that is to say when the upper part and lower part have been bent out of line to give it an initial tension. It is envisaged that the distance from the aperture 74 to the centre portion 73 is considerably less than that separating the shoulders 75a, 75b from the said centre portion. It will be noted that the central part of the centre portion 73 has a depression 73a which in cross-section takes the form of part of a cylinder. Provided in the depression are two recesses 73b, 73c each engaged respectively by the loops 70a, 71a with a view to maintaining the spacing between them.

FIG. 7 shows the solenoid switch C and the pinion shaft 4 at rest. If it is desired to start an engine of which the flywheel is disposed parallel with the pinion 4a, current is supplied to the solenoid switch C which causes displacement of its core 5'' to the right. The hook 67 moves in the same direction, moving the transverse arm of the hook 6'''. The outer face of the depression 73a then bears against a fixed stop 76 on the motor housing so that the lever pivots about this stop, moving the pinion shaft leftwards along the shaft 3. When the lateral faces of the teeth of the pinion 4a and of the flywheel come in contact with one another, after the core 5'' has completed its movement, they are maintained in a bearing relationship by the reaction developed by the elastic lever 6'''. In view of the fact that the movable contact 77 has by that time closed the circuit between the two terminals 78, 79 which operate the electric motor, the pinion 4a is caused to rotate and its teeth penetrate between those of the flywheel. When the supply of current to the solenoid switch C ceases, its core 5'' is restored to position and also restored is the pinion shaft 4 by the reaction of the spring 57 acting on the saucer shaped head 56.

It will be noted that the distance comprised between the shoulders 75a, 75b of the cut-out 75 and the edge thereof adjacent to the centre portion 73 must be at least sufficiently great to allow the lower ends of the arms 70, 71 to move the pinion 4a into full engagement with the flywheel.

What is claimed is:

1. An improved electric starter of the type having a housing, a pinion reciprocable on a pinion shaft toward and away from an engaged position with the gear of an engine, a solenoid switch having an axially reciprocable core, and a lever operatively connected at its first end to reciprocate with the core and having a second end operatively connected to slide the pinion on the pinion shaft, the improvement comprising:

coupling means coupling the core to the first end of the lever in such a way that said first end of the lever is urged to reciprocate with the core;

connecting means connecting the second end of the lever to the pinion in such a way that the pinion will be moved axially with respect to the pinion shaft when the first end of the lever is reciprocated;

fixed opposed bearing surface means supported on the housing and located to bear against an intermediate portion of the lever to act as a fulcrum to cause pivoting of the lever, said intermediate portion of said lever rocking between engagement first with one of said fixed bearing surfaces and then subsequently into engagement with the other of said bearing surfaces as a result of movement of the solenoid core;

said lever comprising a hairpin-shaped steel wire member having a closed first end receiving said coupling means, and having arms extending away from said first end and comprising the second end of the lever engaging said connecting means, and the intermediate portion of the lever including a bent spring loop in each arm disposed between said bearing surfaces and operative to yieldably bias the pinion on the shaft in the direction in which the second end of the lever is urged by reciprocation of the core; and a plate attached to the lever intermediate its ends and operative to distort said spring loops and pre-tension them thereabout, said plate having first and second cut-outs through which the first and second ends of the lever respectively extend, and the plate having a central portion shaped to abut the spring loops and pre-tension the legs of the lever thereabout.

2. In a starter as set forth in claim 1, said plate passing between said spring loops and one of said fixed bearing surfaces, and the lever pulling the plate against the bearing surface when the core is reciprocated toward engaged position.

3. In a starter as set forth in claim 2, the plate having recesses in its central portion shaped to receive said spring loops and locate them for the purpose of maintaining predetermined leg separation.

4. In a starter as set forth in claim 1, sliding block means on the pinion shaft and comprising said connecting means, the ends of the legs engaging said blocks.

5. In a starter as set forth in claim 1, said coupling means comprising a rod extending from the core and having one end hooked over the closed end of the lever member, and the rod having a washer fixed thereto near the hooked end, and a spring between the washer and the solenoid and urging the hooked end away therefrom.

6. In a starter as set forth in claim 5, a member on the washer shaped to retain the rod hooked over the first end of the lever.

* * * * *